United States Patent

[11] 3,556,013

[72] Inventors Harold H. Kruer
 Fort Mitchell, Ky.;
 Melvin A. Raney, Cincinnati, Ohio;
 Clifford L. Elmore, Loveland, Ohio
[21] Appl. No. 733,565
[22] Filed May 31, 1968
[45] Patented Jan. 19, 1971
[73] Assignee Precision Welder & Flexopress Corporation
 Cincinnati, Ohio
 a corporation of Ohio

[54] FLUID MOTOR POWERED RAILWAY CAR
 7 Claims, 5 Drawing Figs.
[52] U.S. Cl..................................................... 104/157,
 29/33, 77/5, 82/2.5, 82/3, 105/65
[51] Int. Cl....................................................... B61b 13/12,
 B61c 7/02, B61c 8/00
[50] Field of Search.......................................... 29/33.12;
 77/5.1; 82/2.5, 3; 104/156, 155, 158, 159; 105/63,
 65, 64; 29/33; 104/157

[56] References Cited
 UNITED STATES PATENTS
 5,205 7/1847 Parsey......................... 105/65X

| 16,220 | 12/1856 | Carson........................ | 104/158 |
| 193,356 | 7/1877 | Thompson.................... | 105/65 |
| 338,681 | 3/1886 | Wiedling...................... | 104/157 |
| 531,511 | 12/1894 | Conti........................... | 104/158 |
| 701,961 | 6/1902 | Swanitz....................... | 104/157X |
| 1,537,642 | 5/1925 | Laffey.......................... | 105/64 |
| 2,677,332 | 5/1954 | Vollenweider............... | 105/65 |

Primary Examiner—Arthur L. La Point
Assistant Examiner—Howard Beltran
Attorney—Wood, Herron & Evans ABSTRACT: A railway system for transporting a workpiece between work stations including a movable workpiece-supporting carriage having a fluid motor and a fluid tank connected to the motor for enabling the motor to propel the carriage along a guide interconnecting the work stations, and one or more tank rechargers located at one or more of the work stations and/or at one or more points intermediate the work stations which are in fluid supplying relationship to the tank of a carriage located proximate the recharger for recharging fluid tanks as their associated carriages travel along the carriage guide from one work station to another.

PATENTED JAN 19 1971

INVENTORS
Harold H. Kruer
BY Melvin A. Raney
Clifford L. Elmore
Wood, Herron and Evans
ATTORNEYS 3,556,013

FLUID MOTOR POWERED RAILWAY CAR

This invention relates to workpiece transport systems for transporting a workpiece between spaced work stations, and more particularly to a workpiece transport system in which self-propelled workpiece-supporting carriages movable on a carriage guide interconnecting the work stations transport workpieces supported thereon from one work station to another.

In the past it has been proposed, for the purpose of automating the manufacture of products requiring a number of different steps, to provide a plurality of spaced work stations each capable of performing on the product or workpiece a different one of the necessary manufacturing or other steps. In accordance with this proposal, the workpiece is successively transported from work station to work station where it is sequentially subjected to the different steps of the respective work stations by means of a self-propelled carriage which travels along an endless track linking the various work stations. In its simplest form, self-propulsion of the carriage has been provided by inclusion therein of an electric motor. The motor is energized, via appropriate brushes, from the carriage guide which, in addition to guiding the carriage, also serves as a continuous electrical bus bar. With such an arrangement, a workpiece secured to the carriage is successively worked upon at each work station as the electrically driven carriage propels itself along the endless guide.

While the above electrically driven carriage proposal finds utility in many applications, certain disadvantages accompany its use. For example, the electrical carriage transport system presents the possibility of electrical shock from the electrically energized guide. Additionally, when used in manufacturing operations involving volatile materials, such as paint spraying and the like, the electrical system presents the possibility of explosion caused by sparking between the energized guide and cooperating brushes.

A further disadvantage of the electrically driven carriage arrangement is the continuing consumption of electric power when the carriage motor stalls as the carriage stops at each work station to enable the workpiece carried thereby to be subjected to the different manufacturing operations. As those skilled in the art will appreciate, when an electric motor stalls, the current drawn by the motor increases by a substantial factor. This increase, which does no useful work but only serves to heat the motor windings, increases power consumption, and hence the cost of operating the system. In practice, this cost increase is substantial since the time a carriage spends stopped at the various work stations may greatly exceed the time the carriage spends moving between stations. Moreover, the electric heating may shorten motor life or limit the range of operable temperature environment.

It has been an objective of this invention to provide a system for transporting a workpiece between spaced work stations which does not unnecessarily consume power and thereby increase the cost of operation, and which does not subject manufacturing personnel to safety hazards occasioned by explosions and electrical shock. This objective has been accomplished in accordance with certain principles of this invention by incorporating in a workpiece transport system, which has a self-propelled carriage sequentially movable from work station to work station along an endless guide linking the work stations, the unique combination of a carriage-mounted fluid motor and pressure fluid tank, and a stationary pressure fluid source located adjacent the carriage guide for recharging the carriage-mounted tank as the carriage is driven from station to station by the tank-supplied fluid motor.

In accordance with a preferred form of this invention, the carriage-mounted fluid tank and motor are interconnected by a selectively actuable valve. The valve is adapted to engage a stop element located along the guide proximate the pressure fluid source to deactuate or close the valve and terminate the supply of pressure fluid to the motor, thereby arresting the carriage at the fluid source. Also included in the preferred form of this invention is a pressure fluid conduit connected to the pressure fluid source which is movable or reciprocal between an outer position, wherein the conduit connects to the carriage tank for recharging the tank with pressure fluid, and an inner position, wherein the conduit is disconnected from the tank.

The pressure fluid source and reciprocal conduit preferably are located at the work stations to enable recharging of the carriage-mounted tanks while the workpiece is being operated upon, thereby introducing no unnecessary delays. However, where substantial distances separate the work stations, additional pressure fluid sources and reciprocal conduits may be provided at points intermediate the work stations. This enables self-propelled carriages to be propelled between distant work stations without need for extremely large tanks.

Other features and advantages of this invention will become more readily apparent from a detailed description of the invention taken in conjunction with the drawings in which.

Figure 1:
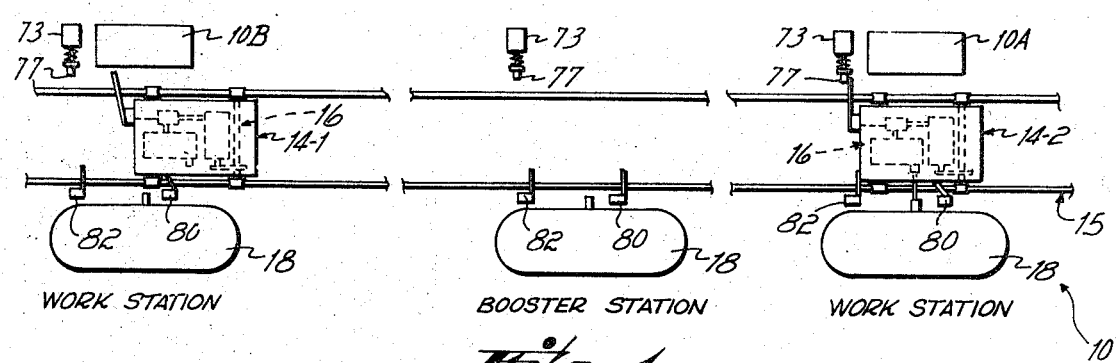
FIG. 1 is a schematic plan view of a workpiece transport system incorporating certain principles of this invention.

Referring to FIG. 1, a preferred form of workpiece transport system incorporating certain of the concepts and principles of this invention is depicted. The workpiece transport system includes a plurality of work stations 10, of which two work stations 10A and 10B are shown. The stations 10 may be arranged in a closed loop pattern along an endless carriage guide 15. At each of the work stations 10A and 10B a manufacturing operation is adapted to be performed on a workpiece (not shown) transported thereto. The number and spacing of the work stations 10, as well as the particular manufacturing operations adapted to be performed thereat, are not critical.

A plurality of self-propelled carriages 14–1, 14–2, etc. are also included in the system. The carriages 14 are adapted to support a workpiece thereon and are movable along the guide 15 for transporting workpieces sequentially from one work station to another as the carriages travel along the guide through the closed loop pattern of work stations. The carriages 14 can be identical in construction and each includes fluid motive means 16 responsive to pressure fluid for moving the carriage along the guide.

The workpiece transport system further includes one or more carriage tank recharging stations 18 located along the guide 15 at the work stations and/or points intermediate the work stations. The recharging stations 18 are provided with means to be described which are selectively connectable to the fluid motive means 16 of a carriage 14 located thereat for resupplying fluid motive means with pressure fluid as their associated carriages travel along the guide 15.

Figure 2:
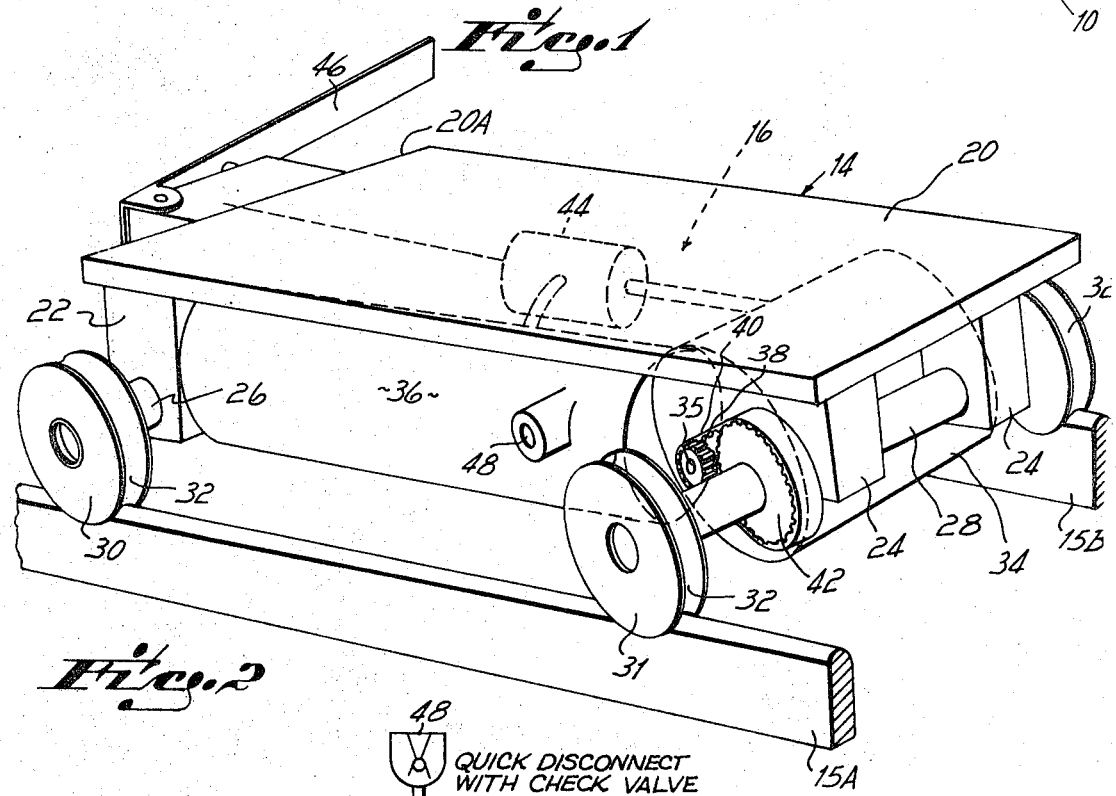
FIG. 2 is a schematic perspective view of a preferred form of carriage suitable for use in practicing this invention.
Figure 3:
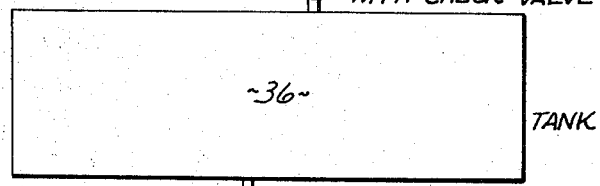
FIG. 3 is a schematic fluid circuit diagram of the carriage-mounted fluid motor and tank.
Figure 3:
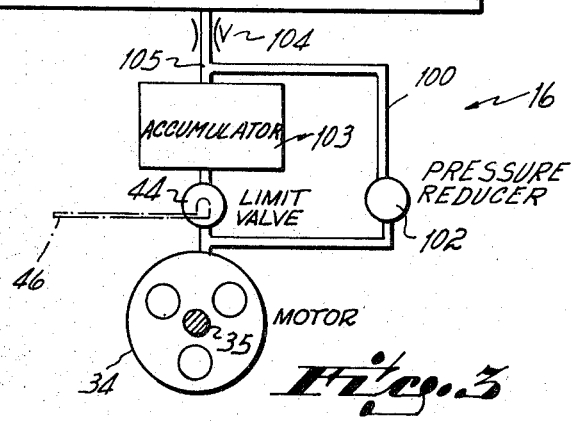

Referring to FIG. 2, a preferred form of carriage is depicted. The carriage 14 includes a flat horizontal platform 20 upon which is adapted to be mounted a workpiece (not shown). The platform 20 has depending therefrom front and rear pairs of axle supports 22 and 24 in which are journaled front and rear axles 26 and 28. Connected to the ends of the front and rear axles 26 and 28 are wheels 30 and 31 having suitably concavely configured peripheries 32 which cooperate with a complementary convexly configured upper surface of the guide rails 15A and 15B, comprising guide 15.

Secured to the bottom surface of the work supporting platform 20 of the carriage 14 is the fluid motive means 16 which preferably includes a fluid motor 34 and a pressure fluid tank 36 connected to the motor for enabling the fluid motor to move the carriage. The fluid motor 34 has an output shaft 35 to which is secured a toothed drive sprocket 38. A toothed belt 40 trained over the sprocket 35 drives the rear wheels 31 via a toothed driven sprocket 42 secured to the rear axle 28.

The fluid motor 34 may be of any conventional type although preferably is of the positive displacement variety, for example, an axial piston pump.

A selectively actuable valve 44 interconnects the pressure fluid tank 36 and the fluid motor 34. The valve 44 includes a movable actuating arm 46 which is operative, upon engagement with a stop element at the recharging station 18, to be described, to terminate the flow of fluid from the tank 36 to the motor 34 thereby terminating forward movement of the carriage to stop it at the recharging station. Associated with the pressure fluid tank 36 is a suitable valve 48 for enabling the tank of a carriage positioned adjacent the source recharging station, for example, carriage 14-2 of FIG. 1, to be recharged.

Figure 4:
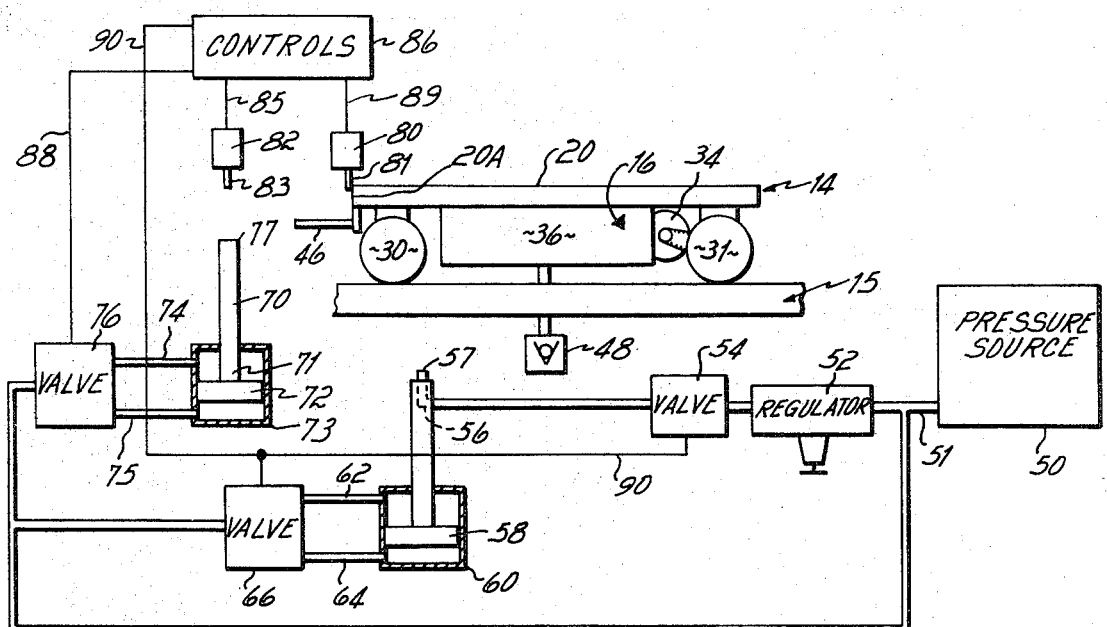
FIG. 4 is a schematic circuit diagram of the pressure fluid source and associated control circuitry.

The tank recharging station 18, as shown in FIG. 4, includes a source of pressure fluid 50, preferably an air supply. The pressure fluid source 50 has an output line 51 connected through a suitable pressure regulator 52 and valve 54 to a conduit 56 which is adapted to cooperate with the tank valve 48 of a carriage 14 positioned at the recharging station for recharging the tank 36. The conduit 56 preferably is secured at its inner end to a piston 58 mounted for bidirectional movement in a cylinder 60 under the action of pressure fluid in lines 62 and 64 which are alternately connectable to the source output line 51 via a two-way valve 66. The conduit 56 is adapted to be moved to an outer position when lines 64 and 51 are connected via the valve 66. In its outer position, the discharge end 57 of the conduit 56 connects to the tank check valve 48 of a carriage located at the recharging station 18, facilitating tank recharging. The conduit is moved to an inner position when the pressure line 62 is connected to the source output line 51 via the valve 66. In this position the discharge end 57 of the conduit 56 is spaced from, and unconnected to, the tank check valve 48 of a carriage located at the recharging station.

The tank recharging station 18 further includes a stop element 70. The stop element 70 at its inner end 71 is secured to a piston 72 mounted for bidirectional movement in a cylinder 73 under the action of pressure fluid in lines 74 and 75 which are alternatively connectable to the fluid source output line 51 via a two-way valve 76. The stop element 70 includes a free end 77 movable into an outer position, in response to connection of lines 75 and 51 by the valve 76, wherein it abuts the valve actuating arm 46 of a carriage positioned at the recharging station, and to an inner position, in response to connection of lines 74 and 51 via the valve 76, wherein the free end 77 of the stop element 70 is clear of the actuating arm 46 of a carriage located at the recharging station.

The recharging station 18 also includes a first limit switch 80 located adjacent the guide 15 at a point sufficiently upstream of the stop element 70 such that its movable actuating arm 81 contacts the leading or forward end 20A of the carriage platform 20 to actuate the switch 80 prior to the point in time when the valve actuating arm 46 is positioned opposite the stop element 70. Further included is a second limit switch 82 located adjacent the guide 15 at a point where it is adapted to have its movable arm 83 contact the front end 20A of the platform 20 when the carriage 14 has come to rest at the recharging station 18 by abutment of the free end 77 of the stop element 70 and the actuating arm 46 of the valve 44.

The limit switch 80 when its arm 81 is initially moved by abutment with the carriage platform front end 20A generates a suitable signal on line 89. This signal is fed to a control means 86 which in response thereto produces on line 88 a signal to the valve 76 which is operative to connect lines 75 and 51 for positioning the free end 77 of the stop element 70 in abutting relationship relative to the actuating arm 46 of the valve 44. The limit switch 82 is effective when its movable arm 83 is initially contacted by the carriage platform front end 20A to generate a signal on line 85. The signal on line 85 is input to the control means 86 which is effective to generate on line 90 a signal to the valve 66 for connecting lines 64 and 51 to advance the conduit 56 to its outer limit of travel wherein the conduit discharge end 57 connects with the tank valve 48 of a carriage properly positioned at the recharging station. The signal on line 90 generated as a consequence of the output of the limit switch 82 is also input to the valve 54 for initiating the flow of charging fluid from the source output line 51 to the conduit 56.

In operation the carriage 14 is propelled along the guide 15 by the pressure fluid in the tank 36 which is fed to the motor 34 via the valve 44 which is in its open condition by reason of the actuating arm 46 being in its outer position shown in conjunction with the carriage 14-1. When the carriage arrives proximate the recharging station, the forward carriage end 20A abuts and moves the actuating arm 81 of the switch 80 generating a signal on line 89 which is input to the control means 86. The control means in turn generates a signal on line 88 to the valve 76 which is effective to connect lines 75 and 51. With lines 75 and 51 so connected, the piston 72 is urged outwardly moving the free end 77 of the stop element 70 into the path of the valve actuating arm 46. Actuation of the switch 80, valve 76 and stop element 70 alone is not sufficient to terminate the supply of pressure fluid to the motor 34 by the tank 36 and thereby arrest motion of the carriage. Consequently, the carriage 14 subsequent to abutment of the switch arm 81 with the carriage front end 20A continues moving down the track 15.

The motion of the carriage 14 along the guide 15 under the action of the fluid supplied motor 34 continues until the actuating arm 46 of the valve 44 abuts the free end 77 of the stop element 70 projected in its path (see carriage 14-2 of FIG. 1). When this occurs the actuating arm 46 moves from the position shown in conjunction with the carriage 14-1 to the position shown in conjunction with the carriage 14-2. With the actuating arm 46 so positioned the valve 44 is closed terminating the interconnection between the pressure fluid tank 36 and the motor 34 arresting the motion of the carriage. At the point where the carriage 14 comes to rest the front end 20A of the carriage abuts and moves the actuating arm 83 of the limit switch 82 generating a signal on line 85 which is input to the control means 86. The signal on line 85 causes the control means to in turn generate a signal on line 90 which is input to both the valve 66 and the valve 54.

The signal on line 90 when input to the valve 66 connects lines 64 and 51 to advance the discharge end 57 of the conduit 56 into engagement with the tank valve 48 of the stopped carriage 14-1 which is now aligned therewith. The signal on line 90 when input to the valve 54 connects the conduit 56 with the output of the regulator 52 enabling high pressure fluid to be discharged from the end 57 of the conduit 56 into the tank valve 48 for recharging the tank 36. When the signal on line 90 generated by the control means 86 terminates the valves 54 and 66 return to their presignal condition wherein the conduit 56 is disconnected from the regulator output 52 and lines 62 and 51 are connected to position the discharge end 57 of the conduit in its retracted position. With the valves 54 and 66 in their presignal position, the tank recharging operation is complete.

Following the termination of the signal on line 90 and the completion of the tank recharging operation, the signal on line 88 generated by the control means 86 terminates, restoring the valve 76 to its presignal condition wherein the line 74 is connected to the line 51 to reposition the free end 77 of stop element 70 into its retracted position clear of the valve actuating arm 46. With the free end 77 of the stop element 70 in its retracted position, the actuating arm 46 is released and returns from its inner position depicted in conjunction with the carriage 14-2 to its normal outer position depicted in conjunction with the carriage 14-1. This opens the valve 44, enabling supply of pressure fluid from the tank 36 to the motor 34 to resume whereupon the carriage again is propelled along the guide 15.

In accordance with one form of the preferred embodiment of this invention the valves 66, 76 and 54 are solenoid actuated. Solenoid actuated valve 66 is biased such that in the absence of an electrical signal on line 90 fluid lines 62 and 51 are connected to urge the piston 58 and hence the conduit 56 to its retracted position. In the absence of an electrical signal on line 90 to the valve 66, the lines 62 and 51 are connected to urge the conduit 56 to its inner position in which it is out of engagement with the tank valve 48. Solenoid actuated valve 76 like valve 66 is biased such that in the absence of an electrical signal on line 88 fluid lines 74 and 51 are connected to urge the stop element 70 to its retracted position. In response to the presence of an electrical signal on line 88, valve 76 interconnects lines 75 and 51 to urge the stop element 70 to its outer position with the free end 77 thereof in the path of the actuating arm 46 of valve 44. Solenoid actuated valve 54 is biased such that in the absence of an electrical signal on line 90 fluid conduit 56 is disconnected from the output of the regulator 52. The bias is overcome, however, by the presence of an electrical signal on line 90 to cause the solenoid actuated valve 54 to interconnect conduit 56 and the output of the regulator 52.

The control means 86 may take form of a motor which drives, through a one-revolution clutch, a cam shaft in response to abutment of the actuating arm 81 with the carriage front end 20A. The cam shaft driven by the one-revolution clutch contains a first cam which is effective to close a suitable switch for producing a signal on line 88 for a predetermined time, such as 8 seconds, which is effective to maintain the carriage 14 stopped for approximately 8 seconds. To generate the signal on line 90, a second and similar motor is provided. This motor is responsive to movement of the actuating arm 83 of switch 82 and drives another output cam shaft of a second one-revolution clutch through one revolution. The output shaft of this one-revolution clutch is also provided with a cam and functions to close a suitable switch for energizing line 90 for a predetermined time less than the time for which line 88 is energized, for example, 4 seconds. Such a 4 second signal is of sufficient duration to enable initiation of tank charging and completion thereof prior to termination of the signal on line 88 which deactuates the valve 44 and enables the carriage to resume movement along the guide 15.

An advantage of using a positive displacement type motor is that when the valve 44 is closed to disconnect the tank 36 and the motor 34, the output shaft 35 of the motor is locked which, via the toothed belt 40, is effective to lock the wheels 31 and maintain the carriage stationary.

To insure that the carriage 14 is, during the recharging cycle, urged in a forward direction to thereby maintain the valve actuating arm 46 in the position shown in connection with the carriage 14-2 of FIG. 1, notwithstanding leakage in the fluid motor 34 which might otherwise enable the carriage 14 to move rearwardly and disengage the actuating arm 46 and the stop element 70, it may be desirable to shunt the valve 44 which interconnects the motor 34 and the tank 36 with a fluid path 100 containing a pressure reducer 102. With such a shunt path established across the valve 44, when the valve 44 is closed by reason of the arm 46 abutting the projected stop element 70, a low pressure supply of fluid is provided to the inlet of the motor 34. This causes the motor to apply a small torque to rear wheels 31 via the shaft 35, sprocket 38, toothed belt 40, sprocket 42, and axle 28. Such a bias torque effectively exerts a small driving force on the carriage 14 in the forward direction, in turn urging the actuating arm 46 and the stop element 70 into engagement, maintaining valve 44 closed.

To insure rapid acceleration of the carriage 14 following a recharging cycle, it may be desirable to place a small accumulator tank 103 between the valve 44 and the main pressure fluid tank 36. The accumulator tank 103 insures that a supply of fluid at the pressure of the fluid in the tank 36 is available to rapidly accelerate the carriage, immediately upon opening of the valve 44 at the end of the charging cycle. Without the accumulator tank 103, throttling which occurs by reason of an adjustable orifice 104 connected in tank output line 105 and used for regulating the maximum velocity of the carriage, may be sufficient upon initial opening of the valve 44 to produce a substantial pressure drop between the tank and the valve 44, causing acceleration upon opening of the valve 44 to be reduced.

Figure 5:
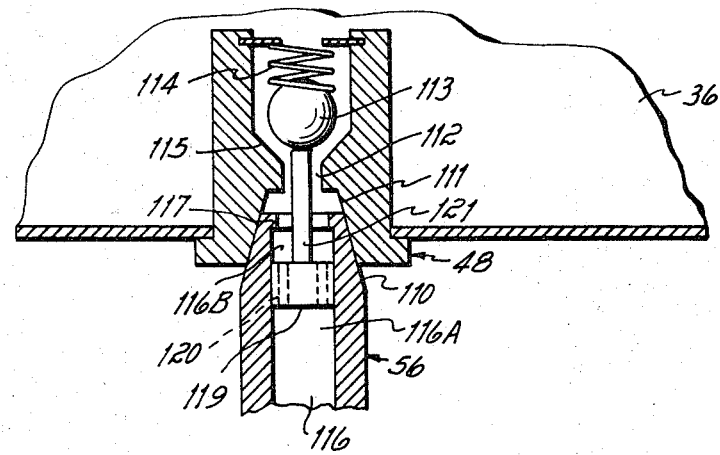
FIG. 5 is a vertical view in cross section of the fluid tank and reciprocal conduit.

Referring to FIG. 5, a preferred form of fluid conduit 56 is depicted. The preferred conduit 56 includes the discharge end 57 having a conical outer surface 110 adapted to snugly seat in a conical bore 111 of the conventional check valve 48 having an opening 112 which is normally sealed by a valve element 113 maintained or biased to a seated position by a spring 114. The conduit 56 further includes a central bore 116 provided with a radially projecting lip 117 at its outer end. Positioned within the bore 116 is a slidable plug 119 having axial bores 120 communicating between inner and outer bore portions 116A and 116B. Secured to the plug 119 is an axial pin 121. The axial dimensions of the plug 119 and pin 121 are such that when pressure fluid from the source 50 is admitted into the bore 116 of the conduit 56 by opening valve 54, the plug 119 is urged axially toward the lip 117, in turn urging axially outward the pin 121 which when the conical surfaces 111 and 110 are in intimate contact urges the ball 113 out of seating contact with the valve seat 115 permitting the bore section 116A to communicate with the interior of the tank 36 via plug bore 120, bore section 116B, opening 112, and unseated ball 113.

In operation, when a carriage 14 has arrived at the recharging station and the switch 82 actuated to generate on line 90 an electrical signal for actuating the valve 66, the piston 58 is urged outwardly by reason of the connection of lines 64 and 51. Movement of the piston 58 urges outwardly the conduit 56 to its projected position causing the conical surface 110 at the discharge end 57 of the conduit 56 to intimately contact the conical bore surface 111 of the check valve 48. Application to the line 90 of the electrical signal also actuates the valve 54 connecting the source of pressure fluid 50 to the bore section 116A of the conduit 56. The resulting introduction of pressure fluid into the bore section 116A urges the plug 119 axially causing the pin 121 to unseat the check valve ball 113. With the ball 113 unseated, pressure fluid in the bore section 116A passes through bores 120, 116B, and 112 to the storage tank 36, recharging the tank. Outward movement of the plug 119 is limited by the internal lip 117. Upon completion of tank recharging, which is effected by termination of the signal on line 90, valves 66 and 54 return to their normal positions causing the conduit 56 to retract and the application of pressure fluid to the bore section 116A to terminate. This permits the plug 119 and pin 121 to return to their normal retracted positions under the action of the spring-loaded ball 113 and the ball 113 to seat.

We claim:

1. A workpiece transport system for transporting a workpiece between spaced stations comprising:
    a movable workpiece-supporting carriage adapted to support a workpiece;
    a carriage guide interconnecting said stations for guiding the movement of said carriage between said stations;
    fluid motive means mounted on said carriage for moving said carriage along said guide, said fluid motive means including a fluid motor and a fluid tank connected to said motor for enabling said fluid motor to move said carriage;
    a tank recharger located along said guide in fluid supplying relationship to the tank of a carriage located thereat for recharging fluid tanks as their associated carriages travel between said stations;
    means responsive to the arrival of said carriage in proximity to a station to control said carriage such that said carriage will stop in position to be engaged by said recharger; and
    means moving said recharger from an inactive position to a charging position, effecting connection of said carriage with said recharger at said charging position, disconnecting said recharger at the completion of recharging, and thereafter permitting said carriage to start moving.

2. The system of claim 1 wherein selectively actuable valve means are connected intermediate said fluid motor and fluid tank for disconnecting said tank from said motor, and further wherein valve operating means are mounted along said guide to close said valve means as said carriage passes said valve operating means, and wherein said fluid motive means further includes an accumulator tank connected between said fluid motor and said control means for accelerating said motor upon reopening of said valve means.

3. The system of claim 1 wherein said fluid motive means includes a check valve to permit pressure fluid to enter said tank, and wherein said recharger includes a piston positioning a conduit connectable to said check valve to permit pressure to be supplied through said check valve to said tank from a source.

4. The system of claim 3 wherein said system further includes means responding to the arrival of a carriage at a station to advance said piston to place said conduit in recharging connection with said tank.

5. The system of claim 3 wherein said check valve includes a biased movable valve element normally in a seated tank sealing position, and wherein said conduit includes a pin disposed therein and movable under the pressure of source fluid to unseat said valve element and permit said source fluid to resupply said tank.

6. A workpiece transport system for transporting a workpiece between spaced work stations comprising:
- a movable workpiece-supporting carriage adapted to support a workpiece;
- a carriage guide interconnecting said work stations for guiding the movement of said carriage between said work stations;
- fluid motive means mounted on said carriage for moving said carriage along said guide, said fluid motive means including a fluid motor and a fluid tank connected to said motor for enabling said fluid motor to move said carriage;
- a tank recharger located along said guide in fluid supplying relationship to the tank of a carriage located thereat for recharging fluid tanks as their associated carriages travel between said stations; and
- a first and second fluid path interconnecting said tank and said motor, a selectively actuable means in said first path for selectively supplying, when actuated, high pressure fluid from said tank to said motor to enable said motor to apply a relatively high drive force to said carriage, and means in said second path to supply low pressure fluid from said tank to said motor to enable said motor to apply a relatively low drive force to said carriage when said selectively actuable means is deactuated.

7. The system of claim 6 further including a stop element operatively associated with said pressure fluid source and engageable with said selectively actuable means for deactuating said selectively actuable means when said carriage is proximate said source, thereby arresting the motion of said carriage which is then maintained in an arrested condition by said low drive force which urges said carriage-mounted selectively actuable means and stop element into engagement.